United States Patent [19]
Cantwell

[11] Patent Number: 4,514,772
[45] Date of Patent: Apr. 30, 1985

[54] APPARATUS FOR READING/WRITING DATA ON MAGNETIC DISC

[76] Inventor: Gill Cantwell, 2434 Purdue Ave. #17, Los Angeles, Calif. 90064

[21] Appl. No.: 465,139

[22] Filed: Feb. 9, 1983

[51] Int. Cl.³ .................................................. G11B 5/55
[52] U.S. Cl. ........................................ 360/75; 360/106
[58] Field of Search ...................... 360/75, 76, 78, 106

[56] References Cited

U.S. PATENT DOCUMENTS

| | | | |
|---|---|---|---|
| 3,124,789 | 3/1964 | Wasylenko | 360/106 |
| 3,384,880 | 5/1968 | Duinker et al. | 360/106 X |
| 4,334,252 | 6/1982 | Toriu | 360/104 |

FOREIGN PATENT DOCUMENTS 55-135332 10/1980 Japan ...................................... 360/77

*Primary Examiner*—George G. Stellar
*Attorney, Agent, or Firm*—Nilsson, Robbins, Dalgarn, Berlinger, Carson & Wurst

[57] ABSTRACT

Apparatus for incrementally positioning a magnetic transducer read/write head for recording data magnetically upon a single rotating magnetic recording media in the form of a disc wherein the read/write head is moved such that the read/write head gap travels along a locus which is parallel to but displaced from a radial disposed in an orthogonal plane extending from the axis of rotation of the disc.

4 Claims, 2 Drawing Figures

96 TPI, NOMINAL 5¼" DISC DIA.
TUNNEL ERASE

APPARATUS FOR READING/WRITING DATA ON MAGNETIC DISC

FIELD OF THE INVENTION

This invention relates to apparatus for magnetic recording used with computer systems, video systems and the like, in which a single disc incorporating a magnetically recordable surface rotates relative to an electromagnetic read/write head, and more particularly to the relative geometric placement and movement of the magnetic recording and erasing means in such an apparatus.

DESCRIPTION OF PRIOR ART

Electromagnetic read/write heads of the prior art have been configured as narrow as possible to accomodate a maximum number of concentric rings of data (data rings) on a given disc size.

As a result of manufacturing and operating tolerances, the exact radial location of such a head when it is being caused to write new data, will never exactly match the location of the head that had previously written data on that same nominal data ring. Hence, the read/write heads when recording new data on that same data ring will fail to erase fully the previously recorded data. Subsequently, when the head attempts to read the newly recorded data, it can, depending on position, react to a combination of old and new data which cannot be reliably read.

For this reason, it is common practice to add to such apparatus, an electromagnetic erasing head rigidly attached to each side of the read/write head. These heads are described in U.S. Pat. No. 3,964,103, Thompson et al., and are known in this configuration as "straddle erase" in which the erasing gaps are essentially in line with the read/write gap. Whenever data is to be written by the read/write head, these two straddle erase heads are also activated with direct current to create an erased guard ring on both sides of the new data ring. The desired effect is to eliminate entirely any prior data written on that data ring, even if the head is not exactly coincident with the prior data ring. When a subsequent attempt is made to read the newly recorded data ring written with straddle erase, the reading head, if it is offset, will react to a combination of the signal free guard ring, and a portion of the new data ring. This combination can be successfully read.

Because of the difficulty of manufacturing straddle erase heads with their crowded array of electromagnetic structures, another configuration referred to in the art as "tunnel erase" heads has also come into use. In this configuration, the gaps in the erase heads are displaced a small distance from the gap in the read/write head. These heads perform the same function as the straddle erase heads and operate in the same manner except that when data writing is initiated at the read/write head, there is a short delay before the tunnel erase heads are activated to accomodate the movement of the media, and synchronize the activation of the tunnel erase with the arrival of the first magnetic transition. Similarly, when the read/write head ceases to write, there is an identical delay before switching off the tunnel erase heads to cause the erased guard rings to extend to the last magnetic transition.

In those apparatus utilizing a straddle erase head, and in which the read/write head gap is movable in an essentially linear locus, a particular geometric format has been used in which the read/write head gap locus conforms to a path having a radius which if extended, passes through the center of rotation of the disc. The gap in the read/write head is also parallel to this radius, and therefore all data written on the disc consists of magnetic transitions with a radial orientation.

A convenient pitch for the data rings is chosen such as 96 tracks per inch (TPI), and this pitch is maintained as a constant across the surface of the disc. The distance between any two data rings is therefore 1/96 of an inch for a 96 rings per inch format. Pitch is equal to:

$$\frac{\text{DISTANCE ``}L\text{''}}{\text{NUMBER OF INCREMENTS}} = \frac{\text{DISTANCE ``}L\text{''}}{\text{DATA RINGS} - 1}$$

If in an apparatus utilizing a tunnel erase head, the read/write gap were aligned parallel to the radial, then the tunnel erase head gaps would fall outside of the resulting data ring due to the circular geometry of the ring. In order to align the tunnel erase head gaps with the data ring it is necessary to mount the head assembly at an angle with respect to the radius. In prior art 96 TPI, 5¼" drives, 33' minutes has been selected as the standard angle which perfectly aligns the tunnel erase heads with track No. 36 (1.875000 radius). This is illustrated in FIG. 1. The proper angle "B" at a given radius "R" is:

$$\angle B = \text{ARCSINE}((\tfrac{1}{2})C/R)$$

Where C is the distance between the read/write gap and the erase gaps. In this typical prior art format of 96 rings per inch, 89 data ring, 5¼" diameter floppy disc apparatus using tunnel erase, the erase heads function accurately only at track No. 36. This can be seen when one realizes that according to the last formula, the angle B at data ring zero (the outer most ring) ($R_0$) should be 28 minutes, and the angle B at data ring 88 ($R_{88}$) (the innermost ring) should be 46 minutes. Since these two angles are substantially different, the prior art has compromised at an intermediate valve of 33 minutes. This angle is constant for all data tracks. In this format, the read/write head gap locus again conforms to a path having a radius which if extended, passes through the center of rotation of the disc. As a result, the tunnel erase head gaps are displaced from that radius by the offset distance between the read/write gap and the erase gaps. The read/write head gap is then aligned at the angle "B" from the radial locus. Therefore, all data written on the disc consists of magnetic transitions at an angle of "B" from a radial drawn from the center of rotation of the disc to a given magnetic transition. In such an apparatus, a convenient pitch for data rings is chosen such as 96 rings per inch, and this pitch is maintained as a constant as the the read/write head moves across the surface of the disc. As a result, the apparatus reads and writes data at nominal 96 ring per inch locations, but the tunnel erase heads fail to accurately align with the data rings. The radial position of the tunnel erase head gaps will be:

$$R_{ERASE} = \sqrt{(R_0 - C \times \text{SINE}(B))^2 + (C \times \text{COSINE}(B))^2}$$

when the read/write head gap is writing at $R_0$, or 58 microinches inboard of the nominal data ring radius.

Similarly, when the read/write head gap is writing at $R_{88}$, the tunnel erase head gaps will be erasing at:

$$R_{ERASE} = \sqrt{(R_{88} - C \times \text{SINE}(B))^2 + (C \times \text{COSINE}(B))^2}$$

or 140 microinches outboard of the nominal data ring radius. Consequently, the function of the erase head is improperly performed. Whenever the head is positioned on the inner or outer tracks, one of the tunnel erase heads is unnecessarily erasing useful signals, and the other tunnel erase head is unable to completely erase obsolete prior data.

SUMMARY OF INVENTION

It is an object of the invention to provide full erasure of obsolete data by the tunnel erase heads.

It is a further object, to prevent unnecessary erasure of newly written data by the tunnel erase heads.

It is a further object, to read data written on drives constructed to prior art formats.

It is a further object, to write data which can be read on drives constructed to prior art formats.

Apparatus for reading/writing data on a single rotatable magnetic disc in accordance with the present invention includes first means for magnetically reading/writing data on the disc and means for moving the first means along a linear path which is parallel to a radial disposed in an orthogonal plane extending from the axis of rotation of the disc. The linear path along which the first means is moved is displaced from said radial.

DETAILED DESCRIPTION OF THE INVENTION

Figure 1:
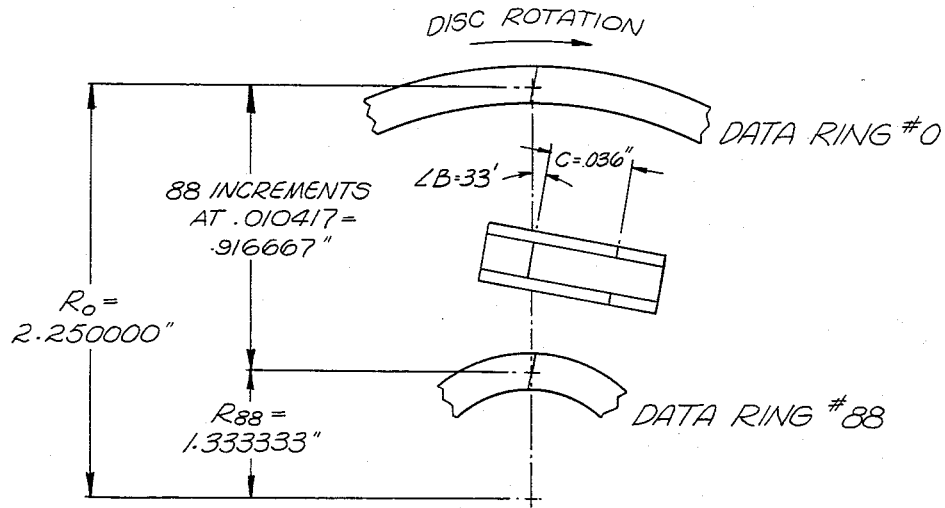
FIG. 1 illustrates prior art.
Figure 2:
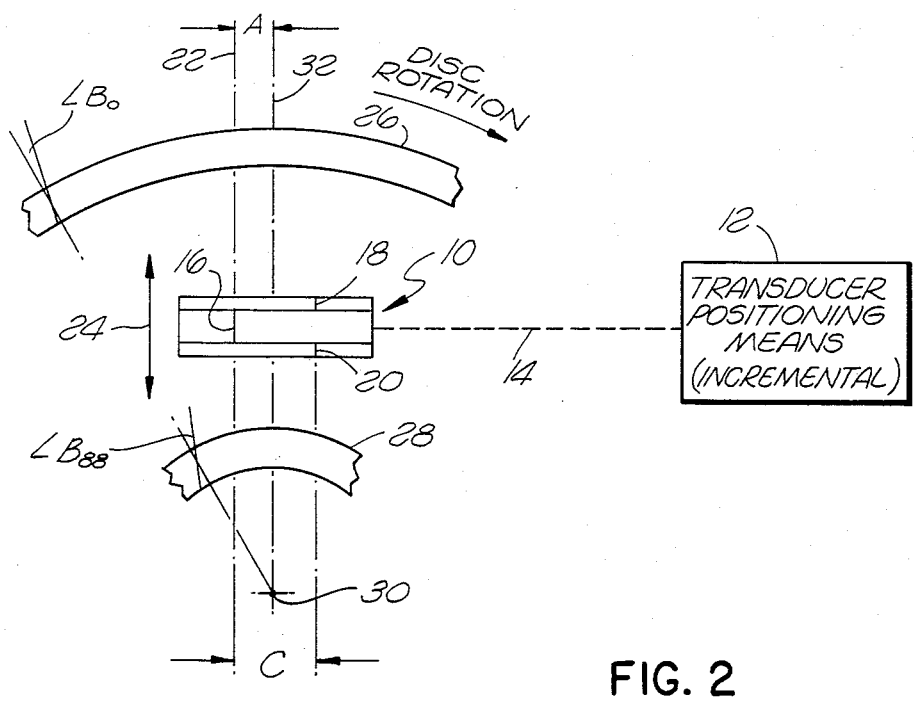
FIG. 2 is a schematic representation illustrative of apparatus constructed in accordance with the present invention and illustrating the manner in which data is magnetically recorded on a rotating magnetic recording media.

As illustrated in FIG. 2 a magnetic transducer means in the form of an electromagnetic read/write head 10 is connected to a transducer position means 12 as is illustrated by the dashed line 14. It should be recognized by those skilled in the art that any read/write head desired and known in the art may be utilized as is the case with any transducer positioning means known to the art. In accordance with a preferred embodiment of the invention the transducer position means 12 would be the type which is shown and described in U.S. patent application Ser. No. 462,740 filed by the applicant herein. As is illustrated in that application the transducer positioning means preferably includes a carriage which is "floated" upon balls which continuously circulate within closed channels disposed on opposite sides of the carriage. A portion of the balls engage the carriage on opposite surfaces thereof and simultaneously a surface formed by the chassis and another surface defined by a support member between which the carriage is sandwiched. The carriage has affixed thereto magnetic read/write heads positionable on each side of a flexible rotating magnetic recording media in the form of a disc (a floppy disc). A stepper motor directly rotates a cam shaft having a plurality of cam surfaces formed thereon each one of which alternately forces a ball into opposed v-shaped notches formed on a movable rack disposed on the carriage and a fixed rack disposed on the support means (the racks having different pitches) in such a manner that the opposed v-shaped notches are caused to become aligned by the ball being forced therein. As the alignment occurs the carriage is caused to move to a pre-determined position ascertained by the electrical signals applied to the stepper motor thus positioning the read/write heads at the desired position with respect to the floppy disc.

The read/write head 10 is illustrated in the drawing as being a typical "tunnel erase" read/write head assembly. Such an assembly includes a read/write head gap 16 and erase gaps 18 and 20 formed therein. It should, however, be understood that the present invention is equally applicable to other head formats such as the "straddle erase". As the positioning means 12 functions to drive the read/write head 10 it moves in such a manner that the read/write head gap 16 travels along a linear path or locus defined by the line 22 in the figure. This motion is illustrated by the double-headed arrow 24. As the head 10 is thusly moved, it is positioned at a desired position with respect to the surface of the rotating magnetic disc which is represented generally by the plane of the paper upon which the drawing is placed. As the head 10 is magnetically activated it will produce data at predetermined positions normally referred to as data tracks or rings upon the surface of the rotating magnetic disc. Two such tracks are schematically illustrated in the drawing and generally represent the outermost positioned track 26 and the inner most positioned track 28. In accordance with the normal terminology used in the art, track 26 would be referred to as data track zero while the inner most track 28 would normally be referred to in a common format as data track 88. Rotation of the rotatable magnetic disc would occur about a point 30 which may be viewed as the axis of rotation of the magnetic disc. As will be recognized, the axis of rotation 30, if extended, would form a line extending orthogonally through the plane of the paper upon which the drawing is made. Referring again to the fact that the magnetic disc upon which the tracks 26 and 28 are recorded is visualized as being the paper upon which the drawing is made, it can be seen that the magnetic disc is effectively disposed in an orthogonal plane extending from the axis of rotation 30 of the rotating magnetic disc.

By forming a radial disposed in the orthogonal plane extending from the axis of rotation of the disc, for example as shown as 32, it will be recognized that the read/write head gap locus is displaced from the radial 32 by a pre-determined distance generally designated as "A" on the drawing. Preferrably as illustrated in the drawings the distance "A" by which the read/write gap is displaced from the radial 32 is one-half the distance between the read/write head gap 16 and the erase gaps 18–20 when a "tunnel erase" head is used.

In the prior art whether straddle or tunnel erase formats were utilized, the data recorded in any given apparatus upon the rotating magnetic disc was recorded as magnetic transitions of fixed angular displacement from a matching radial which was equal for all data rings.

In accordance with the present invention the angle of the magnetic transitions to their matching radials is variable with the radius of the data ring. In accordance with the preferred embodiment of the present invention the angle of the magnetic transitions to their matching radials is equal to:

$$\angle B = \text{ARCSINE}(A/R)$$

where: B is the angle between the radial and the magnetic transition as shown at $B_0$ and $B_{88}$ on the drawing.

A is ½ the distance between the read/write gap and the erase gaps; and

R is the distance between the axis of rotation 30 of the disc and the center of the data ring or track under consideration such as shown at 26 and 28 in the drawing.

Utilizing the foregoing information and formula and taking for example a 5¼" floppy disc having 96 data tracks per inch (TPI) recorded thereon, data track zero (26) at a radius of 2.250000 inches, and utilizing a tunnel erase head with a spacing between the read/write gap and the erase gaps of 0.036 inches, those skilled in the art will recognize that the R for track is 1.333333 inches while the R for track 26 is 2.250000 inches assuming that track 26 is data ring zero and track 28 is data ring 88. Under these circumstances the angle $B_0$ is equal to 28 minutes, while the angle $B_{88}$ is equal to 46 minutes. The mean value of the angle is thus calculatable to be 37 minutes and thus approximates the 33 minute fixed value, used in the prior art and the maximum difference from the prior art of 13 minutes at the inner data ring would enable utilization of apparatus constructed in accordance with the present invention to read data written by standard prior art apparatus of the type described above.

In accordance with another feature of the apparatus constructed in accordance with the present invention, the transducer positioning apparatus 12 positions the read/write head gap with respect to the data track pitch in accordance with the following ratio:

$$\frac{\text{HEAD GAP PITCH}}{\text{DATA RING PITCH}} = \frac{\sqrt{R_0^2 - A^2} - \sqrt{R_{88}^2 - A^2}}{R_0 - R_{88}} = 1.000054$$

It is therefore recognized that in accordance with the presently preferred embodiment and utilizing the same dimensions above set forth, that the read/write head 10 moves an extra 54 microinches for every inch of data ring displacement. It is through this extra movement that a data ring pitch compatible with prior art apparatus is achieved. That is, not only can the read/write head 10 read data which has been recorded by prior art apparatus but prior art apparatus can also read data recorded in accordance with the apparatus of the preferred embodiment of the invention.

What is claimed is:

1. Apparatus for reading/writing data on a single flexible rotatable magnetic disc comprising:
   (A) first means for magnetically reading/writing data on said disc including a tunnel erase head including a read/write head gap and erase gaps, said read/write head gap being separated from said erase gaps by a first pre-determined distance;
   (B) second means for moving said first means along a linear path parallel to a radial disposed in an orthogonal plane extending from the axis of rotation of said disc;
   (C) said linear path being displaced from said radial by a distance equal to one half of said first pre-determined distance; and
   (D) said second means positioning said first means in incremental steps along said linear path at a ratio of:

$$\frac{\text{HEAD GAP PITCH}}{\text{DATA RING PITCH}} = \frac{\sqrt{R_{outer}^2 - A^2} - \sqrt{R_{inner}^2 - A^2}}{R_{outer} - R_{inner}}$$

where R = the distance between the axis of rotation of the disc and the center of the data track under consideration, and A = ½ the distance between the read/write head gap and the erase gaps.

2. Apparatus as defined in claim 1 wherein the angle of the magnetic transitions representative of data recorded on said disc with respect to a matching radial is equal to:

$$\angle B = \text{ARCSINE}(A/R)$$

wherein B = the angle of the magnetic transitions, R = the distance between the axis of rotation of the disc and the center of the data track under consideration, and A = ½ the distance between the read/write head gap and the erase gaps.

3. Apparatus for reading/writing data on a single flexible rotatable magnetic disc comprising:
   (A) first means for magnetically reading/writing along a linear path parallel to a radial disposed in an orthogonal plane extending from the axis of rotation of said disc, said linear path being displaced from said radial by an amount substantially equal to 0.018 inches, said second means positioning said first means in incremental steps along said linear path at a ratio of:

$$\frac{\text{HEAD GAP PITCH}}{\text{DATA RING PITCH}} = \frac{\sqrt{R_{outer}^2 - A^2} - \sqrt{R_{inner}^2 - A^2}}{R_{outer} - R_{inner}}$$

where R = the distance between the axis of rotation of the disc and the center of the data track under consideration, and A = 0.018 inches.

4. Apparatus as defined in claim 3 wherein the angle of the magnetic transitions representative of data recorded on said disc with respect to a matching radial is equal to:

$$\angle B = \text{ARCSINE}(A/R)$$

wherein B = the angle of the magnetic transitions, R = the distance between the axis of rotation of the disc and the center of the data track under consideration, and A = 0.018 inches.

* * * * *